Oct. 22, 1968   W. J. SACKETT, SR   3,406,847
AUTOMATIC BIN LEVELING SYSTEM
Filed Dec. 20, 1965   3 Sheets-Sheet 1
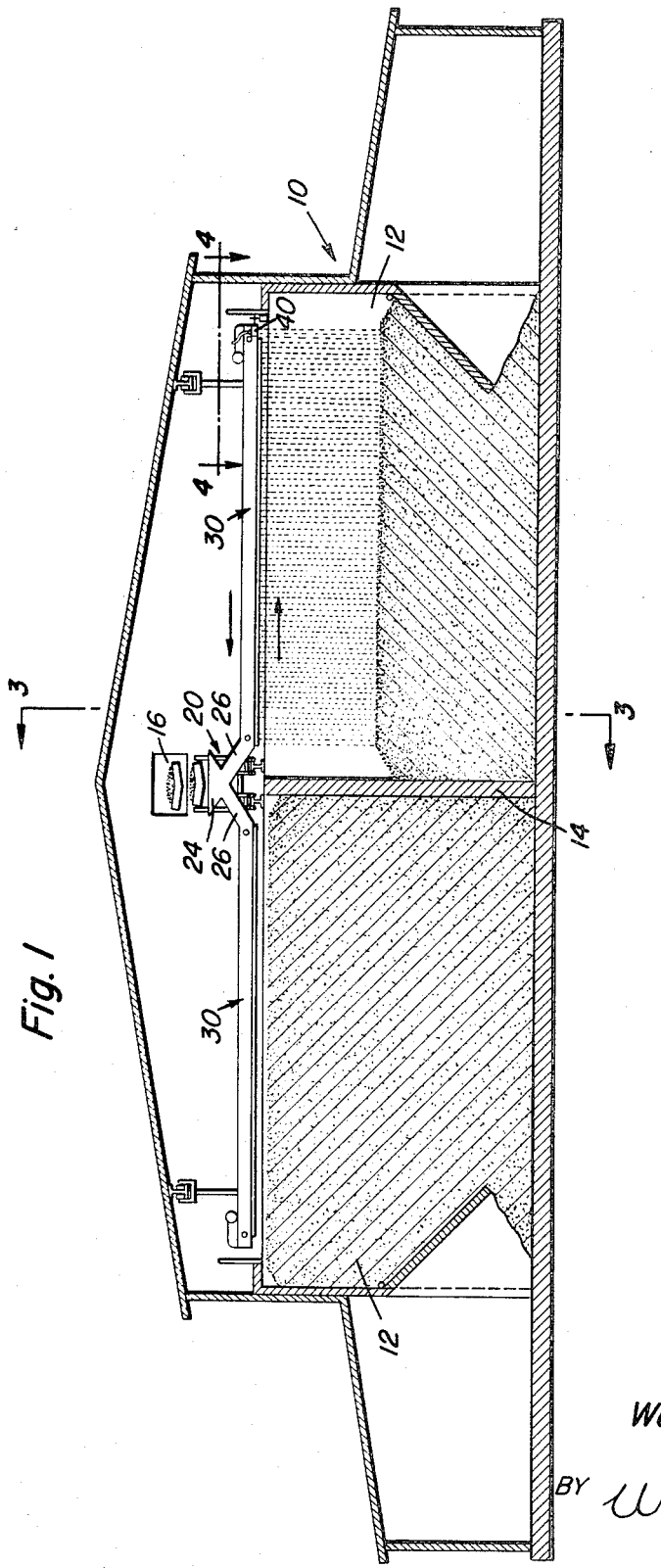
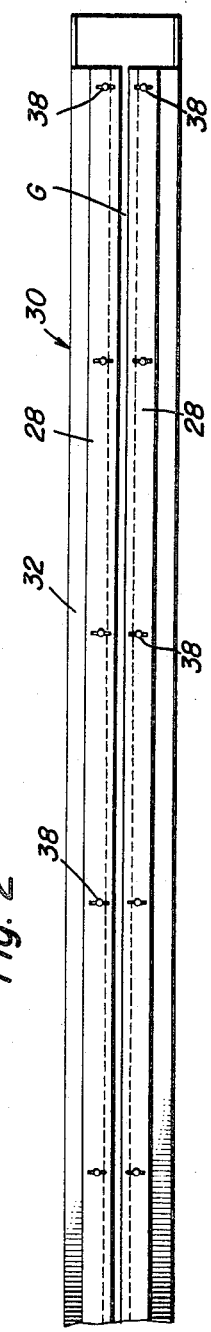
INVENTOR
Walter J. Sackett, Sr.
BY Walter G. Finch
ATTORNEY

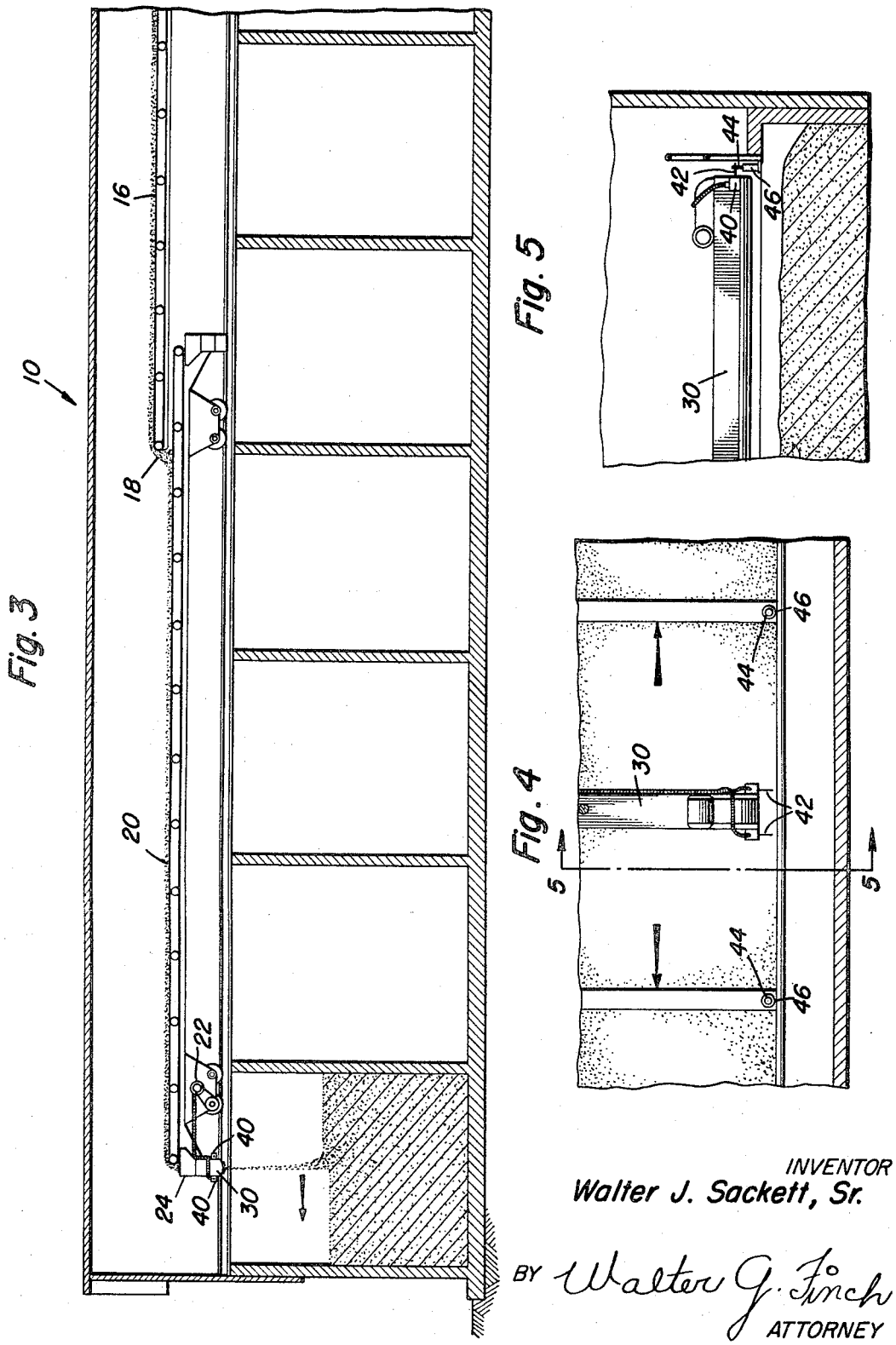

Oct. 22, 1968  W. J. SACKETT, SR  3,406,847
AUTOMATIC BIN LEVELING SYSTEM
Filed Dec. 20, 1965  3 Sheets-Sheet 3
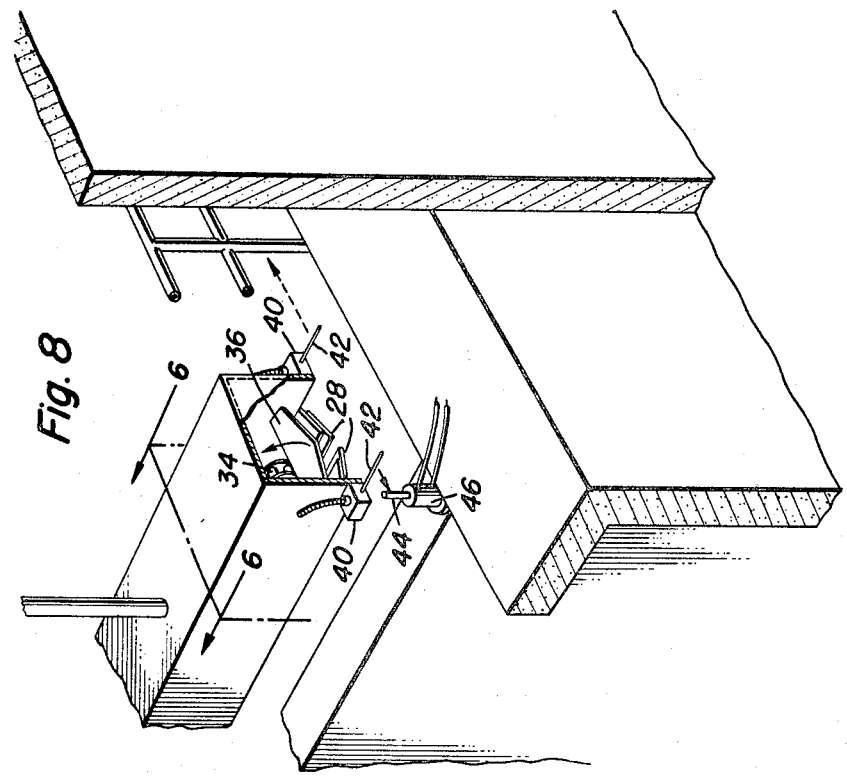
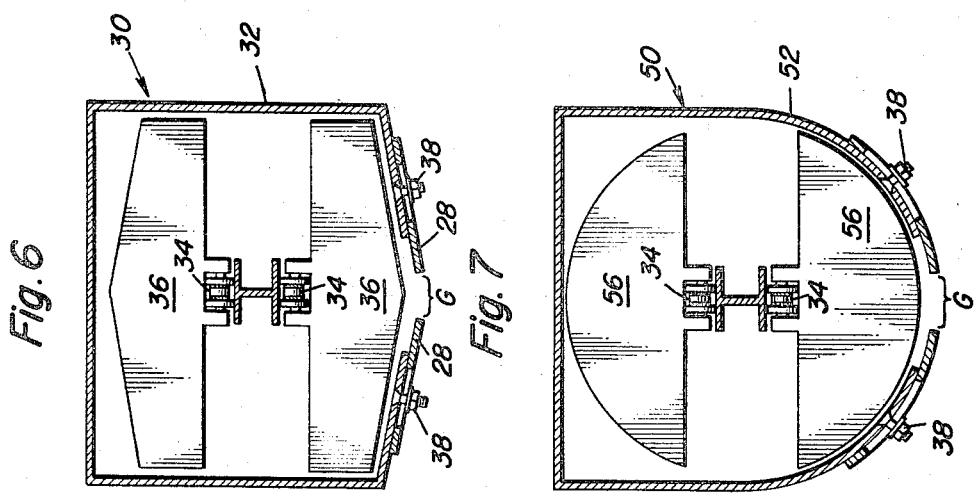
INVENTOR
Walter J. Sackett, Sr.
BY Walter G. Finch
ATTORNEY

# United States Patent Office 3,406,847
Patented Oct. 22, 1968

3,406,847
AUTOMATIC BIN LEVELING SYSTEM
Walter J. Sackett, Sr., Baltimore, Md., assignor to The A. J. Sackett & Sons Co., Baltimore, Md., a corporation of Maryland
Filed Dec. 20, 1965, Ser. No. 515,124
4 Claims. (Cl. 214—17)

ABSTRACT OF THE DISCLOSURE

A system for distributing granular material into a series of bins is provided which includes a conveyor for the material movably positioned over the bins. The conveyor has a portion of its bottom open and a loop of paddles operate to move the granular material along the conveyor to be distributed through the opening in the conveyor bottom. Limit switches are provided to shift the position of the conveyor within a bin and to cause the conveyor to shift from one bin to another.

---

This invention relates generally to storage buildings, and more particularly it pertains to a bin arrangement utilizing a power driven automatic distributing type conveyor.

The filling of bins with free flowing material in the past has generally been a manually supervised procedure requiring the positioning of chutes, ducting, and spouts and a periodic relocation of same to prevent a large build-up or mound which would choke discharge exits and overflow bins which were perhaps only partially filled.

An object of this invention is to provide a system of conveyors which can be run continuously and which is automatically operated so at all times a level condition obtains for the material in a bin.

Another object of this invention is to provide a semi-automatic storage plant having a plurality of bins and a traversing conveyor adopted to selectively fill the same in a uniform manner without the aid of movable chutes and the like.

To provide a distributing conveyor which is adjustably leaky, is yet another object.

And to provide a bin filling arrangement which prevents self-segregation of the material by size, is yet another object of the invention.

Other objects and attendant advantages of this invention will become more readily apparent and understood from the following detailed specification and accompanying drawings in which:

FIG. 1 is a cross sectional end view of a bulk storage plant incorporating improved bin filling features of this invention;

FIG. 2 is a bottom view of a portion of distributing conveyor;

FIG. 3 is a longitudinal section of the plant taken on line 3—3 of FIG. 1;

FIG. 4 is a plan view of the end of a distributing conveyor viewed in the direction of the arrows 4—4 of FIG. 1;

FIG. 5 is a side elevation thereof;

FIG. 6 is an enlarged cross section of the distributing conveyor taken on line 6—6 of FIG. 8;

FIG. 7 is a view similar to FIG. 6 showing an alternate construction; and

FIG. 8 is an enlarged detailed perspective of one end of a bin and showing a portion of the distributing conveyor.

Referring now to the details of the invention, FIG. 1 depicts generally a bulk storage plant 10 for granular materials of various kinds. This plant 10 features a bin loading arrangement for utilizing the maximum capacity of each bin 12. To this end, the rectangular bins 12 are located adjacent to each other and arranged in two rows having a commons wall 14.

A conveyor 16 brings granular material for storage into the plant 10 from manufacturing process or railroad cars (not shown) and discharges it at a central point 18 in the plant 10 onto an H-shaped traveling conveyor 20. It can be seen from FIG. 3 that the length of the traveling conveyor is substantially one-half the length of the plant. A greater length would prevent the traveling conveyor from discharging at the center of the plant, and a lesser length would prevent it from reaching from the central point discharge of the fixed conveyor to either end of the plant. This traveling conveyor 20 can be positioned by a truck motor 22 to discharge (from one end or the other) into any bin 12 of the plant. For this purpose, the belt of the conveyor 20 is reversible in direction of operation and it is provided with a hopper 24 on each end. Each hopper 24 is provided with a pair of oppositely directed branches 26 leading over opposite sides of the common wall 14. A valve (not shown) inside the hopper 24 is positionable to allow only one branch 26 to be used at a time.

A distributing conveyor 30 extends horizontally in continuation of each branch 26 for the full length of a bin and it consists of a generally rectangular cross section, open bottom housing 32 in which is mounted a motor driven endless chain 34 equipped with spaced paddles 36. The paddles 36 travel in the direction of the solid arrow in FIG. 8 and move material over a spaced pair of gate plates 28. These plates 28 are slot mounted and can be adjusted by means of bolts 38 for any desired spacing or gap G as shown in FIGS. 2 and 6 so as to "leak" material uniformly for the length of the conveyor 30. These plates 28 can be arranged, if desired, so that the gap G is of a uniform width throughout or they can be adjusted to form a V-shaped gap from one end to the opposite end thereof.

While a bin 12 is being filled, the truck motor 22 is allowed to move the entire H-shaped traveling conveyor 20 in a limited oscillatory degree defined by the width of said bin 12. This is done automatically by a reversing switch or switches 40 mounted on the end of the conveyor 30 and connected with the motor 22. The actuator 42 of the switch 40 extends so as to be contacted by a trigger pin 44 of a stop 46.

By locating the stops 46 on top of the side walls of the bins 12 and locally or remotely actuating them in desired pairs to erect their trigger pins 44, the to-and-fro movement of the conveyor 20 can be continued automatically until the bin 12 is brim full. With a trigger pin 44 of a stop 46 retracted, the distributing conveyor can pass therebeyond and relocate to serve another bin 12, in the previously related manner.

To avoid corners where material can accumulate in the distributing conveyor, an alternate design is shown by reference 50 in FIG. 7. Here the paddles (ref. 56) are arcuate and conform closely to an open bottom, rounded housing 52. The leaking gap G is defined by the spacing of curved adjustable gate plates 58.

Obviously, many modifications and variations of the present invention are possible in light of the above teachings. It is, therefore, to be understood that within the scope of the appended claims, the invention may be practiced otherwise than as specifically described.

What is claimed is:
1. A conveyor system for adding granular material to a bin, comprising, an elongated housing positioned over said bin and having an opening extending along at least a substantial portion of the bottom of said housing; means positioned within said housing for distributing granular material added to one end of the housing along the length of said opening, means for moving said housing transversely of its longitudinal axis across said bin, means for controlling the movement of said housing across said bin, said controlling means including switch elements for defining the limits of movement of said housing and actuating elements for actuating said switch elements at said limits, and means for retracting said actuating elements so that said housing can move beyond said limits of movement, whereby said granular material falls through said opening and is correspondingly distributed within said bin.

2. In the system as recited in claim 1 wherein the means positioned within said housing for distributing said granular material includes an endless-conveyor transversely affixed to each respective end of the reversible housing for translation therewith and for receiving material for lateral distribution therefrom.

3. In the system as recited in claim 2, a pair of adjustable plates defining the edges of said opening in said housing.

4. In the system as recited in claim 2, wherein the opening in said housing is V-shaped for regulation of distribution of said granular material by the said system.

References Cited

UNITED STATES PATENTS

| | | |
|---|---|---|
| 636,557 | 11/1899 | Reeves. |
| 2,194,144 | 3/1940 | Gill. |
| 2,277,416 | 3/1942 | Rutten _____ 214—17 |
| 2,834,484 | 5/1958 | De Vaney et al. ____ 198—111 X |
| 3,140,775 | 7/1964 | Asher _____ 198—174 |
| 3,145,855 | 8/1964 | Plugge et al. _____ 214—17 |
| 3,167,173 | 1/1965 | Sackett _____ 198—174 X |

FOREIGN PATENTS 340,767 10/1959 Switzerland.

ROBERT G. SHERIDAN, *Primary Examiner.*